United States Patent [19]

Davis

[11] 4,054,194
[45] Oct. 18, 1977

[54] DISCHARGE CHUTE FOR CONCRETE MIX

[76] Inventor: Thomas E. Davis, 8919 Birkhill, Sterling Heights, Mich. 48098

[21] Appl. No.: 644,717

[22] Filed: Dec. 29, 1975

[51] Int. Cl.² .............................................. B65G 11/10
[52] U.S. Cl. ..................................... 193/10; 193/2 R; 193/25 R; 366/68
[58] Field of Search .............. 193/2 R, 4, 5, 10, 25 R, 193/25 A, 25 E, 25 FT; 259/172

[56] References Cited

U.S. PATENT DOCUMENTS

| | | | |
|---|---|---|---|
| 892,519 | 7/1908 | Hinchman | 193/10 |
| 1,946,222 | 2/1934 | Mandt | 193/10 |
| 2,672,327 | 3/1954 | Oury | 193/10 |
| 2,717,769 | 9/1955 | Masek | 193/10 |
| 2,948,385 | 8/1960 | Todd | 193/2 R |
| 2,968,382 | 1/1961 | Oury | 193/10 |
| 3,150,753 | 9/1964 | Ivanyi | 193/25 E |

Primary Examiner—Evon C. Blunk
Assistant Examiner—Jeffrey V. Nase
Attorney, Agent, or Firm—Harness, Dickey & Pierce

[57] ABSTRACT

A conveying chute for freshly mixed concrete is made from a metal frame having a replaceable polyurethane liner. The liner is formed flat about a porous metal reinforcement and is held in a curved trough defining shape by the frame.

8 Claims, 7 Drawing Figures

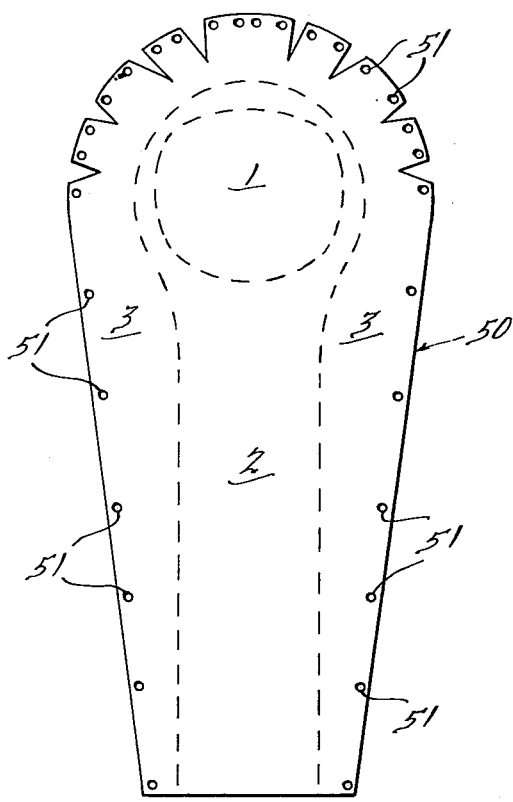
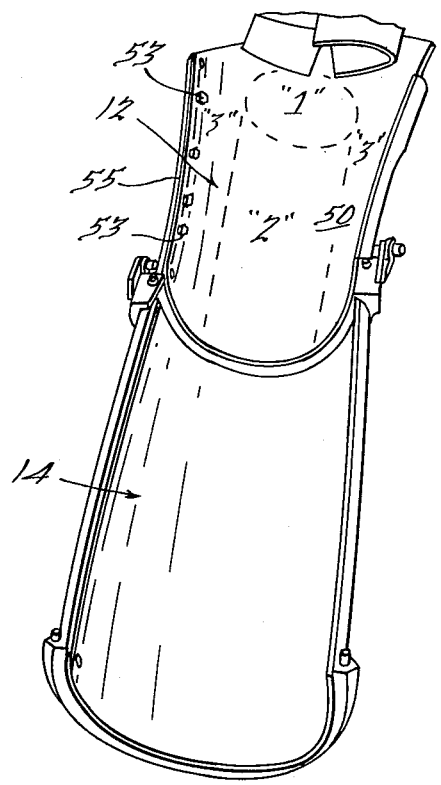
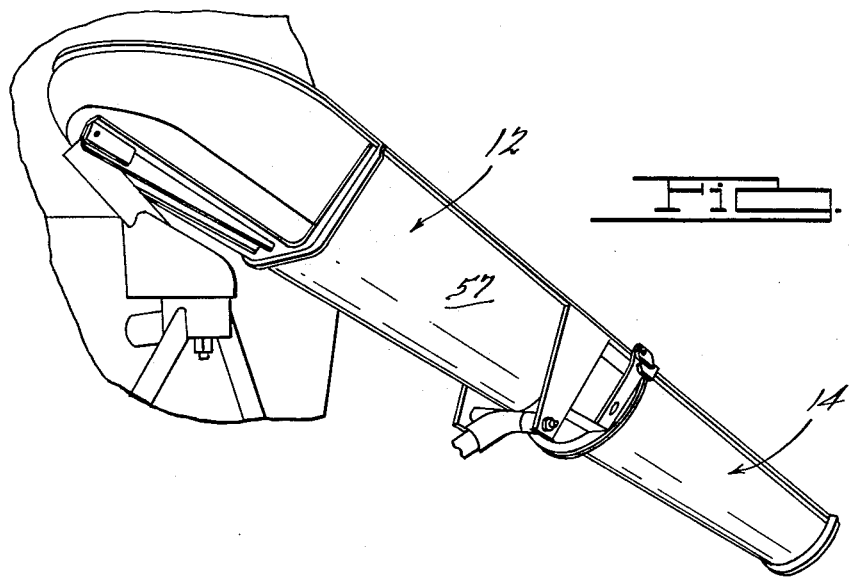

DISCHARGE CHUTE FOR CONCRETE MIX

SUMMARY AND BACKGROUND OF THE INVENTION

Chutes for conveying concrete mix from a mixing truck to a job site have traditionally been made from steel. Steel chutes have suffered from a number of problems. The are heavy, they tend to wear out rather quickly and hardened concrete tends to build up on the chute even though the chute is washed after each use.

The chute of the present invention is relatively light in weight and does not collect concrete as readily as all steel chutes, its surfaces do not wear as rapidly as steel and, when excessive wear does occur, it is possible to replace a wearable lining of the chute without having to discard the entire chute structure. The chute of the present invention utilizes a framework having arcuate cross members to define the desired trough curvature of the chute. A reinforced polyurethane sheet which is initially formed in a flat condition is bent to the curvature of the cross members and is held in place on the frame by threaded fasteners.

The state of the art is indicated by the following U.S. patents: Driller U.S. Pat. No. 3,619,909; Ivanyi U.S. Pat. No. 3,150,753; and, Fernald U.S. Pat. No. 2,658,603.

BRIEF DESCRIPTION OF THE DRAWINGS

FIG. 3 is an enlarged plan view of a portion of the structure illustrated in FIG. 2;

FIG. 5 illustrates a perspective view of another chute embodiment of the invention herein;

FIG. 6 illustrates a rear perspective view of the chute construction shown in FIG. 5; and, FIG. 7 illustrates a view of the special liner used in the chute construction of FIGS. 5 and 6.

DESCRIPTION OF THE ILLUSTRATED EMBODIMENT OF THE INVENTION

Figure 1:
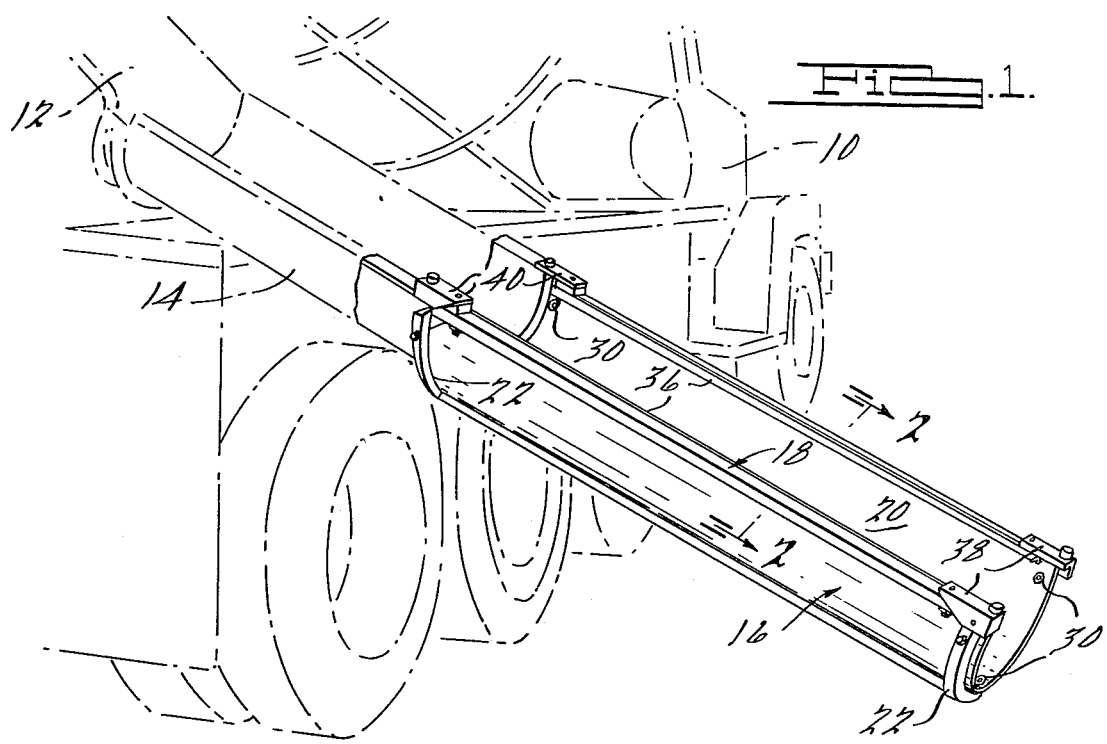
FIG. 1 is a perspective view of a chute made in accordance with the present invention shown in association with a fragmentarily illustrated concrete mixing truck.
Figure 2:
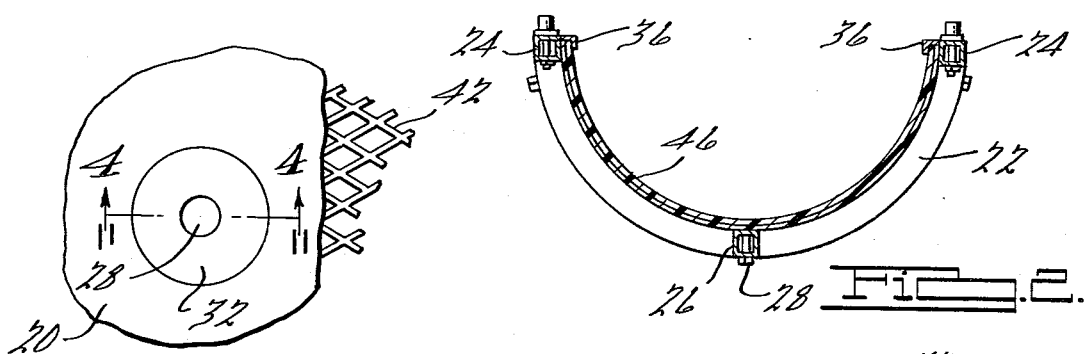
FIG. 2 is an enlarged sectional view of the structure illustrated in FIG. 1 taken along the line 2—2 thereof.
Figure 4:
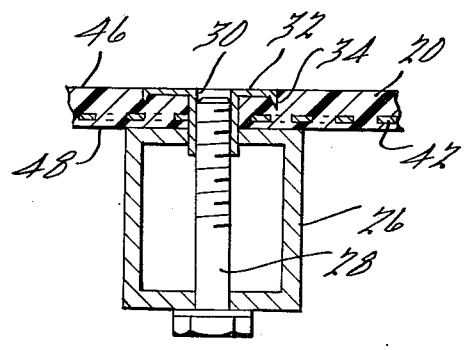
FIG. 4 is a sectional view of the structure illustrated in FIG. 3 taken long the line 4—4 thereof.

FIG. 1 illustrates a concrete mixing truck 10 of the type commonly known as a "ready-mix" truck. A discharge chute 12 is permanently connected to the truck as is a flip chute 14 connected to the discharge chute 12. An extension chute 16 constructed according to the present invention is shown demountably connected to the end of the flip chute 14.

The chute 16 consists of a welded metal frame 18 which may be constructed of steel, aluminum or other suitable material. Fastened to the fram 18 is a liner in the form of a reinforced polyurethane sheet 20. The sheet 20, while being initially formed flat, is bent to a curvature determined by the shape of a pair of arcuate cross members 22 of the frame 18. The two cross members 22 lie at opposite ends of the frame 18 and are connected by a pair of outer longitudinal members 24 lying on opposite sides of the chute 16 and a bottom or intermediate longitudinal member 26 positioned at the bottom of the frame. The sheet 20 is held to the frame 18 by three sets of bolts 28 and nuts 30 at each end of the frame. The nuts 30 are provided with flanges 32 having projections 34 which dig into the sheet 20 to prevent the rotation of the nuts. The bolts 28 pass through the lower longitudinal frame member 26 as well as the arcuate cross members 22 with the heads of the bolts 28 lying on the outer sides of said members. When the bolts 28 are tightened, the flanges 32 of the nuts 30 are drawn into the sheet 20 so as to lie flush with the inner face 46 of the sheet 20.

The upper or outer longitudinal frame members 24 are provided with L-shaped flanges 36 on their inner sides which overlie the upper edges of the sheet toward one another away from the frame members 24. Also mounted on the outer longitudinal members 24 at one end of the frame 18 are pintles 38. Apertured fittings 40 are mounted on the member 24 at the opposite end of the frame 18. The pintles 38 and fittings 40 are adapted to interfit with complementary fittings on the flip chute 14 or on other extension chutes (not shown) similar to the extension chute 16 in order that a series of such chutes may be connected end to end to define a long continuous conveying trough for the concrete mix.

The sheet 20 is formed with an expanded sheet metal reinforcement 42 which lies within the sheet adjacent an outer face 48 of the sheet. The method of manufacture of the sheet 20 is to lay the reinforcement 42 on a flat forming table (not shown) within an open rectangular frame (not shown) dimensioned to the desired outer periphery of the sheet 20. Uncured liquid polyurethane material is then poured over the reinforcement 42 onto the table and allowed to cure. The cured polyurethane material of the sheet 20 as well as the reinforcement 42 are readily bendable so that when the flat sheet is laid on the frame 18, it can be bent by hand to the arcuate configuration of the cross members 22 and bolted to the frame. Of course, the sheet 20 is drilled out to accommodate the nuts 30.

Concrete has a very low affinity for polyurethane and it is, therefore, very easy to wash concrete mix off of the sheet 20 even though the mix may have been left on the sheet for a considerable period of time before the washing. The frame 18 wll be seen to possess minimal bulk, as it is necessary to back the sheet 20 with the frame 18 in only a relatively few places in order to prevent the sheet from bending out of position under the weight of a heavy load of concrete mix. Also it is necessary to fasten the sheet 20 to the frame 18 in the relatively few locations illustrated in FIG. 1. The polyurethane sheet 20 possesses excellent abrasion resistance characteristics and it may be used for a relatively long period of time without wearing out. When the sheet 20 does wear out, however, it is only necessary to loosen the six bolts 28 and provide the frame 18 with a new or replacement sheet 20. The entire structure is relatively light in weight and its initial weight is not adversely affected over a period of usage by the accumulation of excessive amounts of concrete.

FIGS. 5, 6 and 7 illustrate another embodiment of the invention herein. In this embodiment the main discharge chute 12 is shown attached to the truck in the normal manner which renders it pivotable and adjustable in elevation. From the main discharge chute 12 there is pivotally connected the flip chute 14. In FIG. 5 a urethane liner designated 50 in accordance with this embodiment of the invention is bolted in and this liner 50 should generally be bolted in all around the edges on about 10 inch centers. FIG. 7 shows the liner 50 in detail, with the liner 50 being flat when manufactured, yet it is supple and lightweight enough that it will assume the curved chute shape when installed in the main discharge chute 12 of FIGS. 5 and 6. Bolt roles 51 are shown around the periphery of the liner 50 and, the bolts 53 should not be placed in the concrete flow pattern because this will cause rapid wearing away of the bolts. The gap between the liner and the chute (best seen in FIG. 5) is filled with a caulking compound 55, preferably of the urethane type, which will seal the edges and prevent concrete from splashing and lodging between the liner 50 and the underlying metal support frame 57 (FIG. 6). The liner 50 as shown in FIG. 5 is of variable thickness, with their being three variable thickness areas designated by the numerals 1, 2 and 3 in FIG. 5. Typically the area designated with the numeral 1 would be made of a urethane liner material in accordance with this invention which is preferably about ⅜ inches in thickness. The area designated by the numeral 2 is an abrasion wear resistant area having a thickness preferably in the magnitude of about ¼ thickness. The low wear area designated by the numeral 3 which does not come into as much contact with the concrete sliding down the chute, relatively speaking with respect to the areas designated with the numerals 1 and 2, would preferably be of a thickness of approximately ⅛ inch. It has been unexpectedly discovered that urethane liners can be constructed having this variable thickness feature which will greatly maximize the wear resistance to the concrete which is sliding down the chutes. In particular the impact area designated 1 being of maximum thickness provides significantly greater resistance to wear and impact from the concrete which drops unto the impact area designated 1 from the top of the concrete truck.

Still further, in accordance with his invention it has also been discovered that the concrete build up in the chutes is frequently cleaned off with muriatic acid and it has been found that the urethane liners prepared in accordance with this invention are uneffected by such muriatic acid cleaning treatments. Moreover the liners as prepared in accordance with this invention are flat when manufactured yet they are supple and lightweight and the liners will assume the curved chute shape when installed.

While it will be apparent that the preferred embodiments of the invention disclosed are well calculated to fulfill the objects above stated it will be appreciated that the invention is susceptible to modification, variation and change without departing from the proper scope or fair meaning of the subjoined claims.

What is claimed is:

1. A concrete delivery means comprising a mixing vehicle having a chute removably connected thereto for conveying freshly mixed concrete from said mixing vehicle, said chute including a plurality of sections removably assembled end to end, at least one of said sections having a rigid frame including at least two arcuate cross members adjacent opposite longitudinal ends thereof, a pair of longitudinal members extending between and connecting end portions of said cross members, a third longitudinal member extending between and connecting center portions of said cross member, a bendable sheet of polyurethane material supported on said frame and defining an upwardly open trough, and fastening means releasably securing said sheet to said frame and holding said sheet in a transversely curved configuration.

2. A chute as defined in claim 1 wherein a mesh metallic reinforcement is embedded in said sheet and lies along the convex face of said sheet.

3. The structure set forth in claim 2 in which said mesh metallic reinforcement comprises an expanded metal sheet.

4. A chute as defined in claim 1 in which said fastening means comprises threaded fasteners connecting said sheet to said arcuate cross members.

5. The structure set forth in claim 1 including L-shaped flanges formed on said pair of longitudinal members overlying opposite edges of said sheet.

6. The structure as set forth in claim 1 wherein another section includes a rigid frame having a plurality of arcuate cross members and longitudinal members extending between said cross members, abendable sheet of polyurethane material supported on said frame and defining an upwardly open trough, and fastening means releasably securing said sheet to said frame and holding said sheet in its transversely curved configuration, and wherein said bendable sheet contains a plurality of variable thickness portions comprised of a first impact area means operative to provide a high wear resistance to concrete which is dropped on said first area, a second wear resistant area means operative to provide wear resistance to abrasion from concrete sliding down the chute, and a third reduced wear area means operative to provide wear resistance, said first area being of greater thickness than either said second or said third area, and said second area having a thickness greater than or approximately equal to said third area.

7. A chute for conveying freshly mixed concrete from a mixing vehicle, said chute including a rigid frame having a plurality of arcuate cross members and longitudinal members extending between said cross members, a bendable sheet of polyurethane material supported on said frame and defining an upwardly open trough, and fastening means releasably securing said sheet to said frame and holding said sheet in its transversely curved configuration, and wherein, said bendable sheet contains a plurality of variable thickness portions comprised of, a first impact area means operative to provide high wear resistance to concrete which is dropped on said first area, a second wear resistant area means operative to provide wear resistance to abrasion from concrete sliding down the chute, and a third reduced wear area means operative to provide wear resistance, said first area being of greater thickness than either said second or said third area, and said second area having a thickness greater than or approximately equal to said third area.

8. A chute as defined in claim 7 in which said fastening means comprises threaded fasteners connecting said sheet to said rigid frame.

* * * * *